United States Patent [19]

Lassi et al.

[11] Patent Number: 4,830,307
[45] Date of Patent: May 16, 1989

[54] DRAGGING DEVICE FOR A SPINNING REEL

[75] Inventors: Karl-Gunnar Lassi, Karlshamn; Lars-Olof Carlsson, Asarum, both of Sweden

[73] Assignee: ABU Garcia Produktion AB, Svangsta, Sweden

[21] Appl. No.: 60,603

[22] Filed: Jun. 11, 1987

[30] Foreign Application Priority Data

Jun. 11, 1986 [SE] Sweden .................................. 8602614

[51] Int. Cl.$^4$ ............................................. A01K 89/02
[52] U.S. Cl. ........................ 242/84.5 A; 242/84.51 A
[58] Field of Search ................... 242/84.2 R, 84.2 G, 242/84.5 R, 84.5 A, 84.51 R, 84.51 A, 84.5 P, 84.52 R, 218

[56] References Cited

U.S. PATENT DOCUMENTS

| | | | |
|---|---|---|---|
| 3,627,223 | 12/1971 | Monthulet | 242/84.2 G |
| 4,238,085 | 12/1980 | Jansson et al. | 242/84.21 R X |
| 4,291,846 | 9/1981 | Carpenter | 242/84.2 G |
| 4,509,705 | 4/1985 | Councilman et al. | 242/84.5 P X |
| 4,512,536 | 4/1985 | Sato | 242/218 |
| 4,572,448 | 2/1986 | Ban | 242/84.5 A |
| 4,591,108 | 5/1986 | Ban | 242/84.5 P |
| 4,696,437 | 9/1987 | Yoshikawa | 242/84.5 A X |
| 4,702,430 | 10/1987 | Saito | 242/84.5 A |
| 4,746,077 | 5/1988 | Toda | 242/84.5 A |

Primary Examiner—Joseph J. Hail, III
Attorney, Agent, or Firm—Browdy & Neimark

[57] ABSTRACT

A dragging device in a fishing reel of the fixed-spool type having a housing accommodating a spool shaft rotatably mounted therein. A line spool is non-rotatably mounted on the end of the spool shaft projecting from the reel housing. The reel also comprises a transmission for transforming the movement of a handle into a movement of rotation of a member for winding up the fishing line on the line spool. The dragging device consists of a bait drag which is adapted, when fishing with a live bait, to adjustably brake the line spool for conforming to the size of the live bait. The dragging device is arranged for directly or indirectly acting on the spool shaft and for being engaged or disengaged by an outer slide and drag control disposed on the reel housing.

4 Claims, 8 Drawing Sheets

DRAGGING DEVICE FOR A SPINNING REEL

BACKGROUND OF THE INVENTION

The present invention relates to a device in a fishing reel of the fixed-spool type having a housing accommodating a spool shaft which is rotatably mounted in the housing and whose end projecting from the housing carries a line spool non-rotatably mounted on said shaft end, and a transmission for transforming the movement of a handle into a movement of rotation of a means for winding up the fishing line on said line spool.

More particularly, the invention is intended for use when fishing with a live bait.

Present-day techniques employed for braking fixed-spool reels in live bait fishing consist in moving the spool bail sideways, at least in reels of the open-faced type, so that the line can be paid out from the spool completely freely and without any mechanical resistance, and in exerting a pressure on the line in order to reduce its pay-out speed. This often entails a risk of line entanglement because of inadequate braking. Such problems arise because of the inherent "living" properties of the fishing line and because the spool shaft in this position is in principle locked by other brake means acting on the spool shaft.

SUMMARY OF THE INVENTION

One object of the present invention is to provide a device which in connection with live bait fishing facilitates the operation of the reel when paying out the line with the so as to reduce the risk of line entanglement.

The device stated by way of introduction is characterized by a bait drag adapted, when fishing with a live bait, to adjustably brake the line spool and, thus, the line for avoiding line entanglement and adapting to the size of the live bait.

A particular advantage of the invention resides in that the novel bait drag is completely independent of the regular friction brake, meaning that the friction brake need not be operated for adjusting the bait drag, and vice versa, which ensures maximum ease of operation.

Despite the provision of additional adjusting and operating means, the fishing reel remains easy to use in that the bait drag is actuated manually and is adjustable as to its braking power, while automatically reverting to normal position, which means that the regular brake is automatically engaged when the handle is operated for playing with the bait or retrieving a hooked fish.

BRIEF DESCRIPTION OF THE DRAWINGS

The invention will be described in more detail hereinbelow in some preferred embodiments and with reference to the accompanying drawings in which.

DESCRIPTION OF THE PREFERRED EMBODIMENTS

Figure 3:
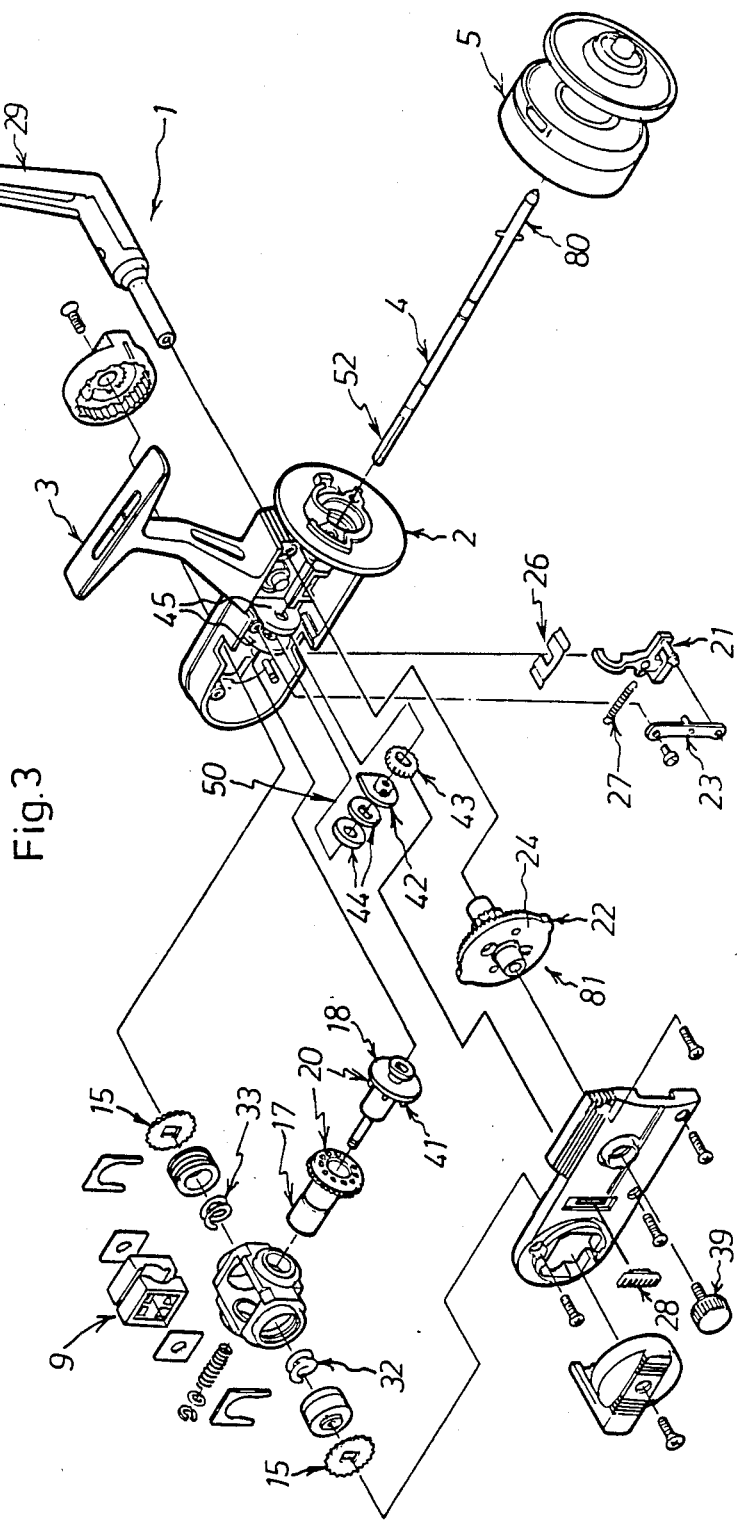
FIG. 3 is an exploded view showing the different parts of a first alternative embodiment of a fishing reel having a dragging device according to the invention.
Figure 7:
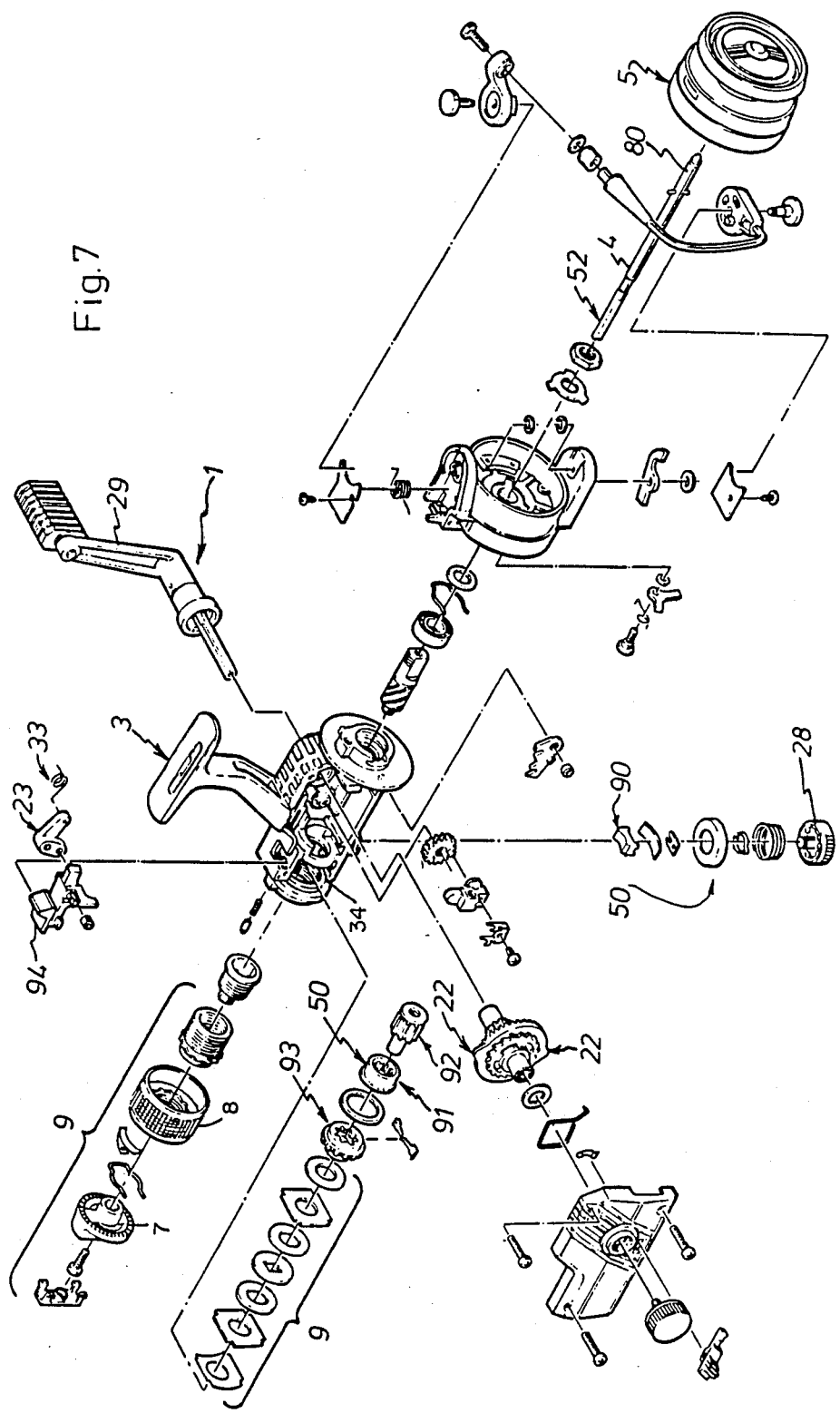
FIG. 7 is an exploded view of the different parts of a third alternative embodiment of a fishing reel having a dragging device according to the invention.

All the illustrated embodiments of a fixed-spool reel 1, provided with a bait drag 50 according to the invention, comprise a friction brake 9 for reducing a load on the line otherwise excessive when playing with a bait or retrieving a hooked fish. The retrieve brake 9 may be a conventional brake having its operating means coaxial with a spool shaft 4 or, as seen in FIGS. 1, 3 and 7 a double brake including brake elements, one for pre-set drag and another for retrieve drag, which are actuable by two separate operating means 7, 8.

It is evident that the fishing reel 1 in another aspect of the invention may comprise only the bait drag 50.

Figure 1:
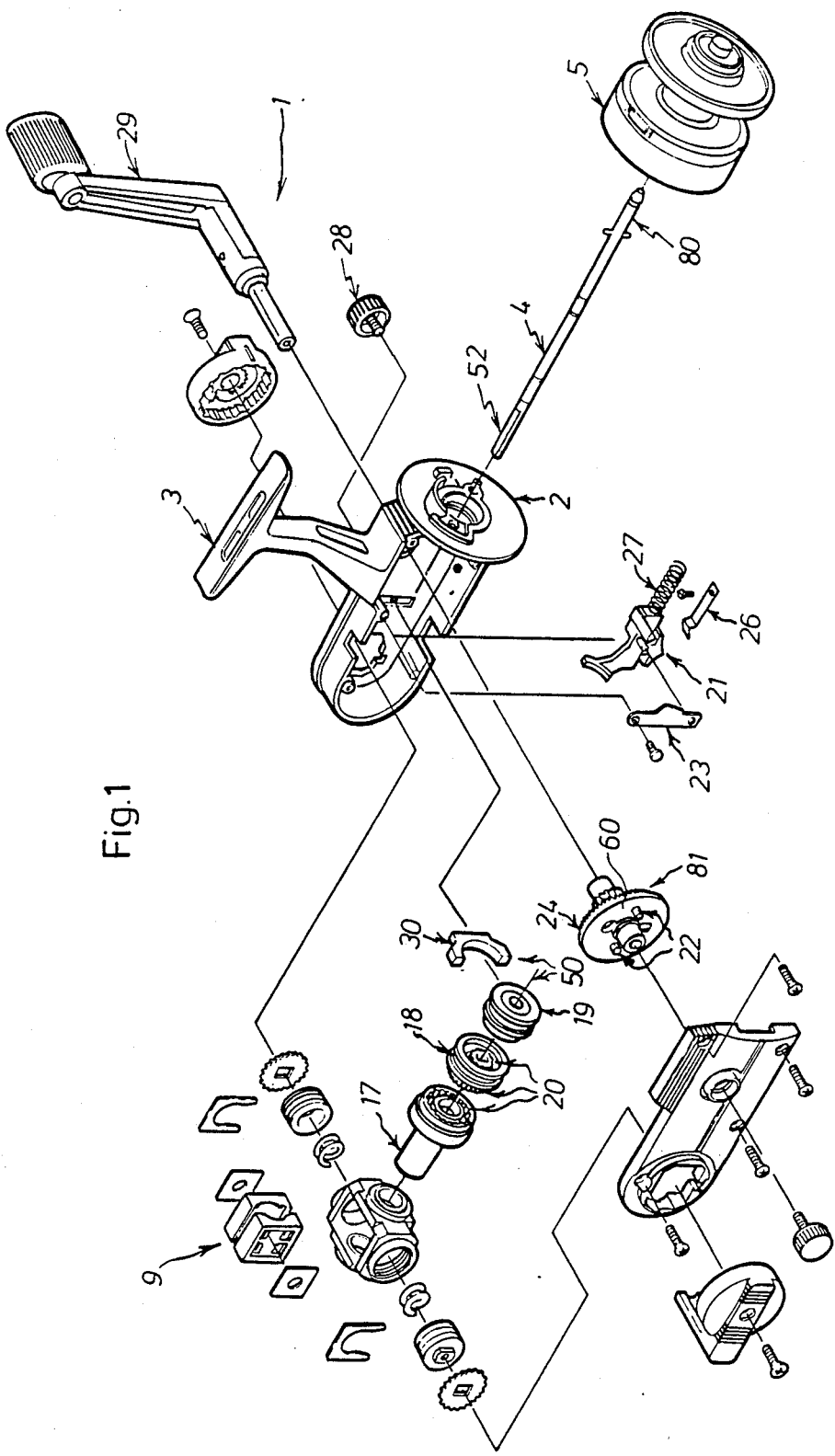
FIG. 1 is an exploded view showing the different parts of a fishing reel having a dragging device according to the invention.
Figure 2:
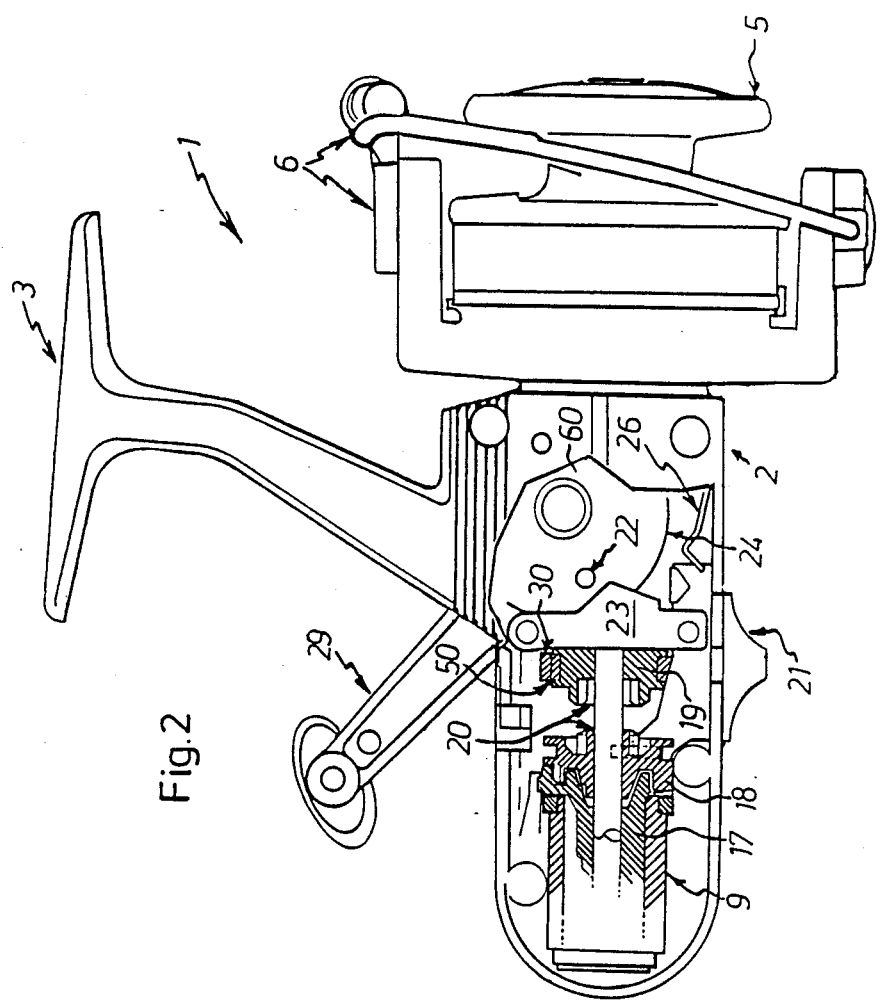
FIG. 2 is a part-sectional side view of the reel with the dragging device of FIG. 1.

The bait drag 50 in FIGS. 1 and 2 comprises a brake cylinder 19 which is movably mounted on a spool shaft 4 and engageable by means of a driver 18 through a clutch 20 and which is acted on by a brake shoe 30. The brake application force can be controlled by a drag control 28.

The driver 18 sliding on a torque-transmitting flattened part 52 of the spool shaft 4 can be brought into engagement with the brake cylinder 19 by means of a control 21 which is disposed on the underside of the reel housing 2 and which is adapted either to bring the driver 18 into engagement with the brake cylinder 19 or to return it to its initial position in which it is engaged with a brake cylinder 17 included in the friction brake 9.

A transmission 81 arranged in the reel 1 serves to transform the movement of a handle 29 into a movement of rotation of a member 6 in the form of a rotor provided with a bail and bail arms for winding up a line on the line spool 5. The transmission 81 has a crown wheel 24 provided on one outer side face 60 with projections 22 adapted to act on a clutch lever 23 for returning the control 21, held by a retainer spring 26, to its initial position under the action of a return spring 27, such that the driver 18 is engaged with the brake cylinder 17.

Figure 4:
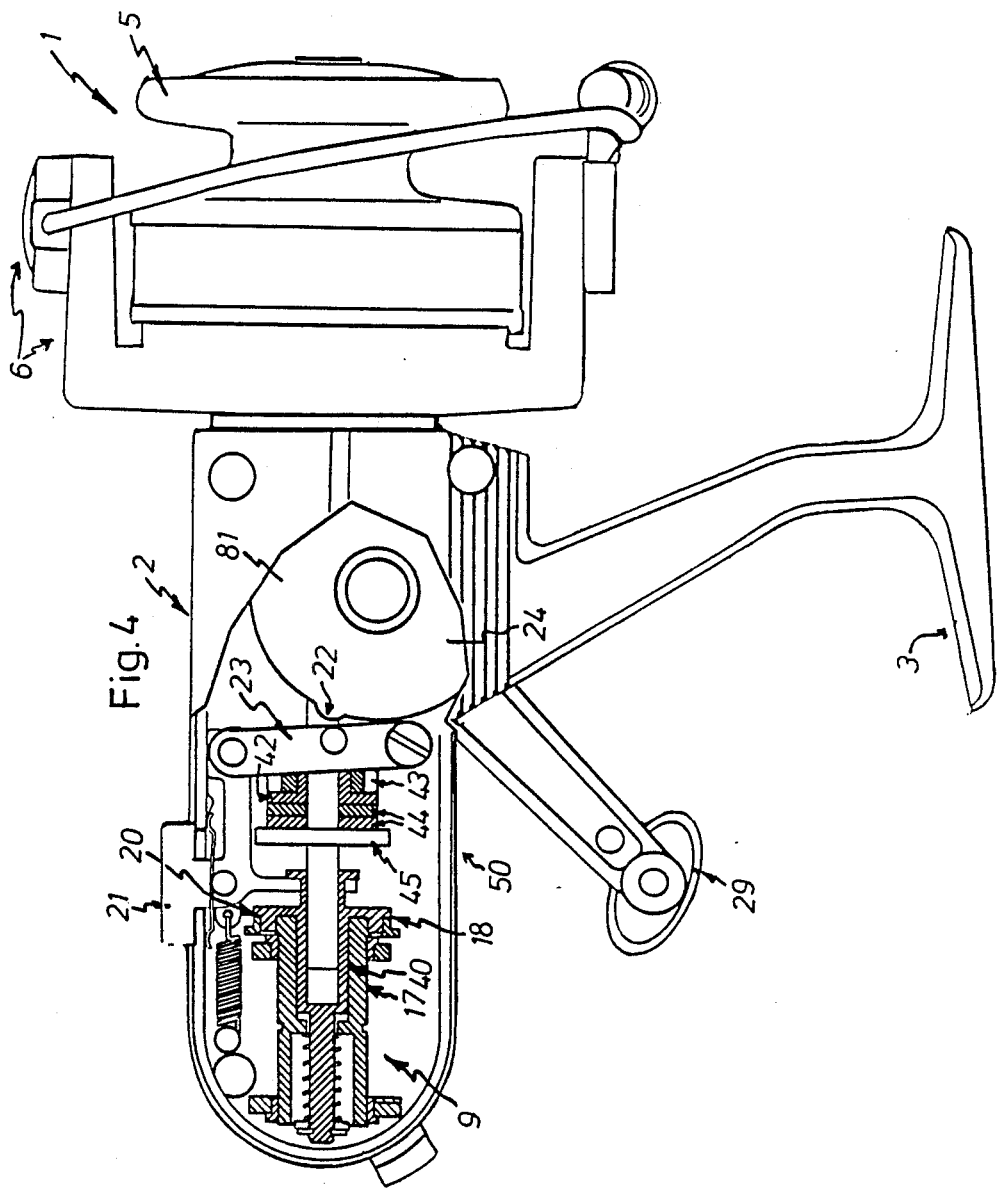
FIG. 4 is a part-sectional side view of the reel in FIG. 3.

In an alternative embodiment shown in FIGS. 3 and 4, the bail drag 50 is of a design different from that of the previous embodiment. The housing 2 has been integrated with two brackets 45 between which there are provided two friction washers 44 and a threaded driver 42. The driver is actuated by an internally threaded gear wheel 43 which is mounted on the spool shaft 4 and in turn actuated by a rack, associated with the drag control 28 on the outer side of the reel, for adjusting the brake application force. In this embodiment, the bait drag 50 is permanently engaged and, therefore, it must also be ensured that the drag control 28 is reset when the bait drag 50 is not used and the friction brake 9 is engaged.

Reengagement of the friction brake 9 is effected in substantially the same way as in the previous embodiment, that is by projections 22 on the crown wheel 24 which act on a clutch lever 23. This makes the control 21 snap past a retainer spring 26 and return to its initial position under the action of a return spring 27.

Figure 5:
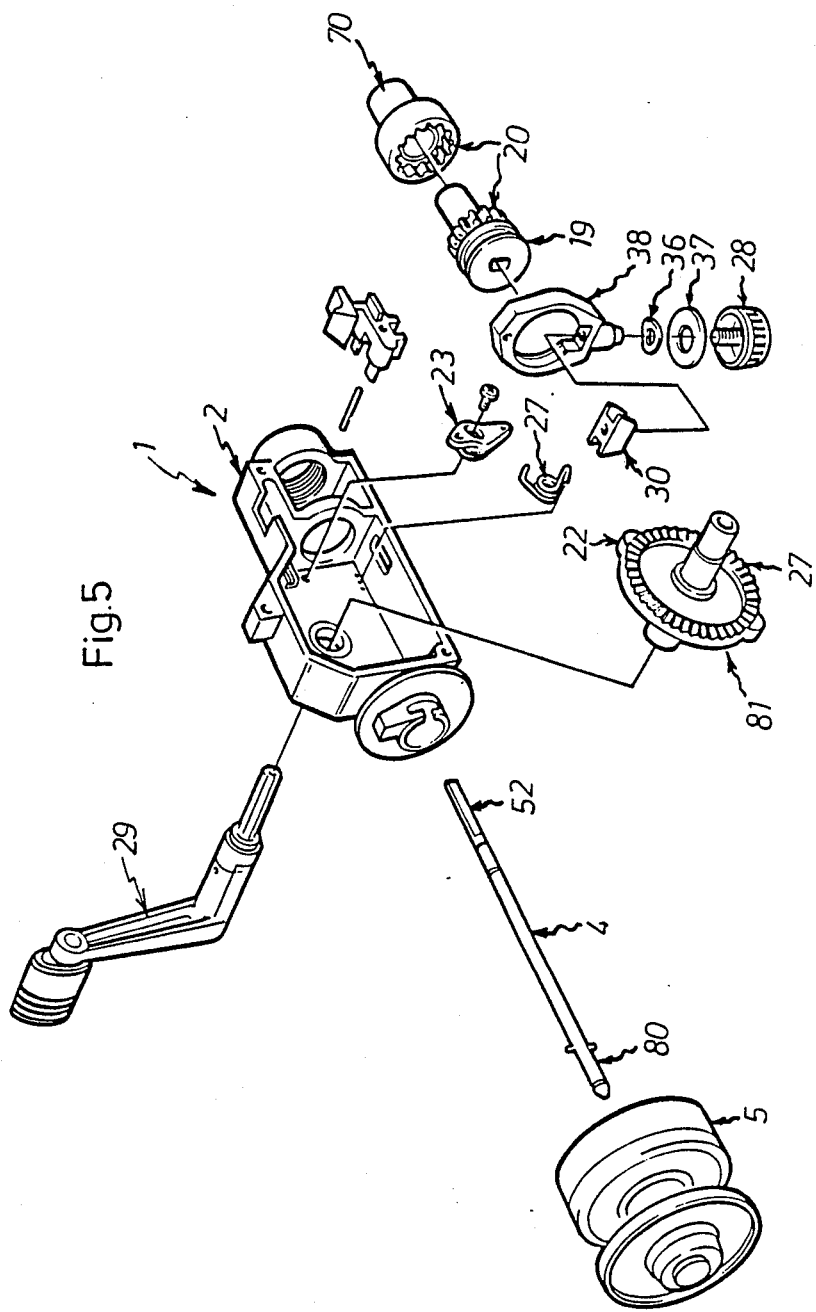
FIG. 5 is an exploded view illustrating the different parts of a second alternative embodiment of a fishing reel having a dragging device according to the invention.
Figure 6:
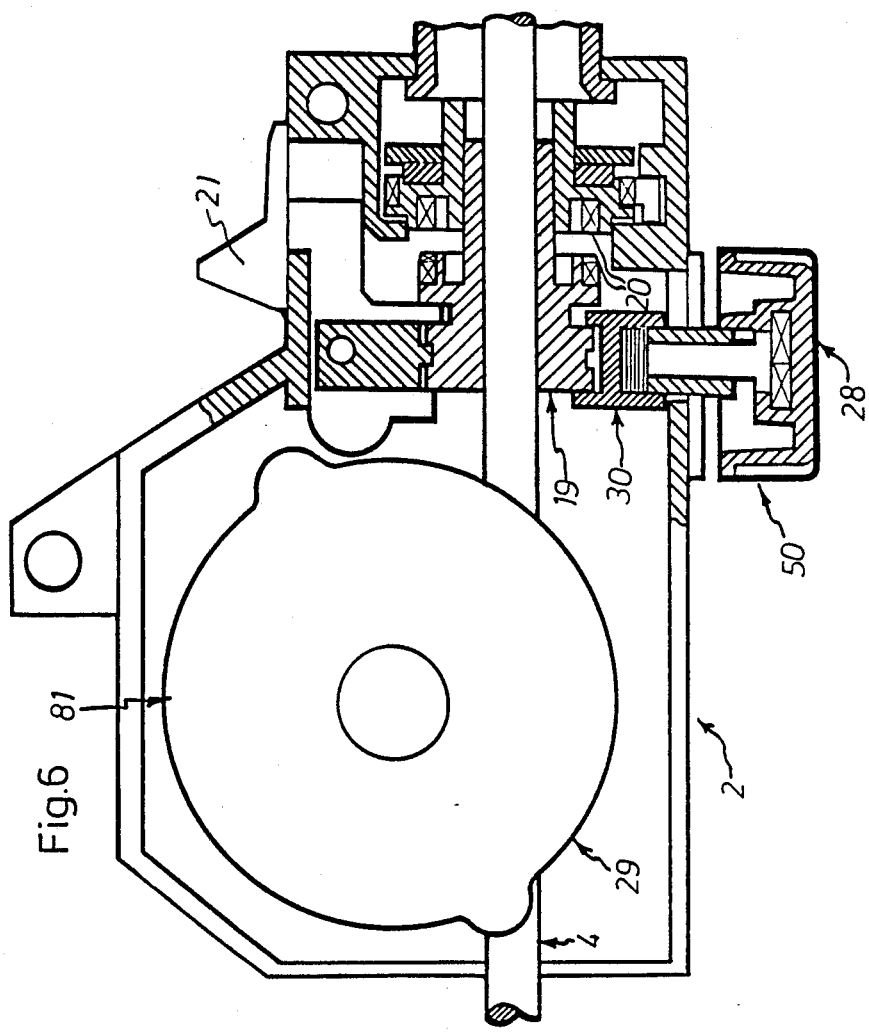
FIG. 6 is a part-sectional side view of the reel in FIG. 5.

A second alternative embodiment of the bait drag 50 is shown in FIGS. 5 and 6. This embodiment comprises a brake shoe mounting 38 which is movavle coaxially on the spool shaft 4 and associated with a brake cylinder 19. The mounting 38 and the cylinder 19 are movable together by means of a control 21 on the top side of the reel housing 2 to effect disengagement with respect to a friction brake 70 provided in a recess 34 in the rear part of the reel. After such disengagement, a brake shoe 30, disposed in the mounting 38, can be screwed in towards the brake cylinder 19 by means of a drag control 28 so as to act on the spool shaft 4 during fishing. Reengagement of the friction brake 70 via the clutch 20 is effected by actuating the handle 29 for retrieving the bait or a hooked fish. The crown wheel 24 is provided with two projections 22 one of which actuates a lever 23 acted on by a spring 27, such that the control 21 is pushed backwards entraining the clutch 20 so as to engage the brake cylinder 19 with the friction brake 70. The drag control 28 is preferably screwed in the brake shoe mounting 38 and acts on the brake shoe 30 in that a threaded pin of the drag control 28 moves the brake shoe 30 either towards or away from the brake cylinder 19 for adjusting the brake application force. The bait drag 50 is continuously adjustable in that the knob of the control 28 is biased by a washer 37 and a spring washer 36 arranged inwardly of the washer 37.

Figure 8:
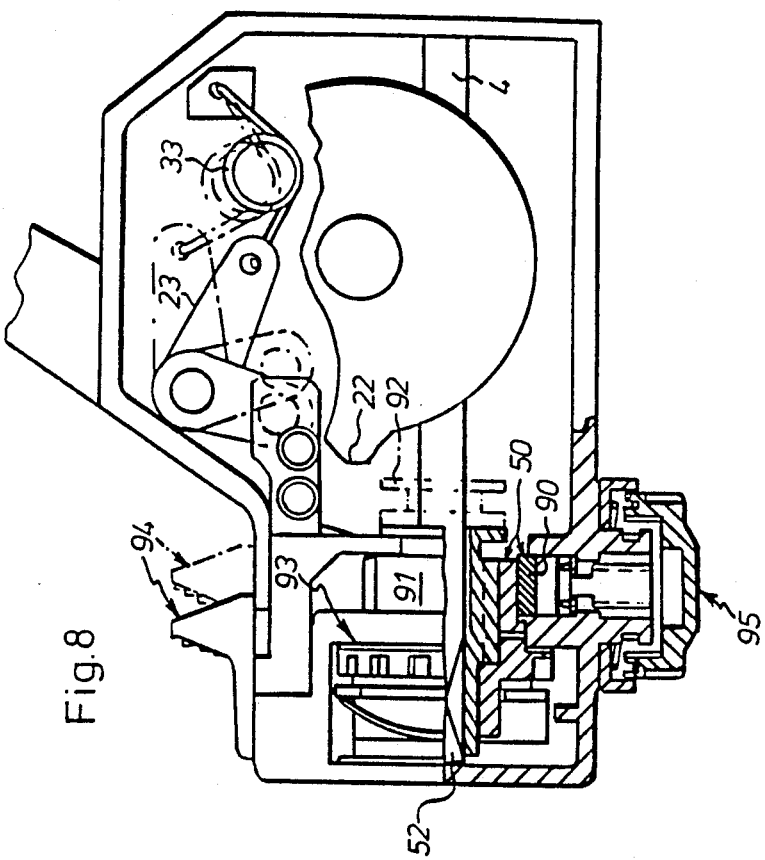
FIG. 8 is a part-sectional side view of the fishing reel with the dragging device of FIG. 7.

A third embodiment of the bait drag 50 is illustrated in FIGS. 7 and 8. In this embodiment, the dragging device comprises an external brake whose brake lining 90 can be applied against a brake sleeve 91 which is non-rotatably mounted on a first driver 92 which in turn, when the spool 5 is rotated, is entrained by a flattened part 52 on the spool shaft 4. When finally mounted in the fishing reel, the driver 92 is still axially displaceable a slight distance forwards and backwards, which means that the powerful retrieve brake 9 of the reel can readily be engaged and disengaged. However, the driver 92 can be moved only a limited distance, its forward movement being limited by the end of the flattened part 52 and its backward movement by the brake sleeve 91 having an axially fixed position in a bracket in the rear part of the reel housing. Since the driver 92 is provided with external splines which in the rear position of the driver 92 penetrate and pass, while cooperating therewith, the brake sleeve 91 provided with internal splines, a second retrieve brake driver 93 having internal splines is partially penetrated and entrained when in this position. Thus, the retrieve brake can be disengaged in that the first driver 92 is moved forwards. The device now described is operated by means provided on the outside of the reel housing, namely by a slide control 94 for engagement and disengagement and a rotary knob 95 for adjusting the application force of the brake lining. Reengagement of the retrieve brake 9 is effected in the same way as in the embodiments previously described. This means that, when the handle 29 is operated, one of two projections 22 provided on the crown wheel actuates a lever 23 biased by a spring 33, such that the slide control is moved back and, along with it, the first driver which is caused to engage the second driver and, thus, the retrieve brake.

For all the embodiments of the invention, it should be pointed out that the bait drag 50 is capable of exerting a resistance load on the line for adaptation to the size of a live bait and to the way the bait moves in the water. It should also be pointed out that the resistance load (0–300 g on the line) produced by the bait drag is considerably less than the braking force exerted by the friction brake 70. Thus, even if the bait drag is permanently engaged, it does not add to the braking force if the friction brake 70 is engaged at the same time.

We claim:

1. Device in a fishing reel of the fixed-spool type having a housing accommodating a spool shaft which is rotatably mounted in the housing and whose end projecting from the housing carries a line spool non-rotatably mounted on said shaft end, and a transmission for converting movement of a handle into a rotational movement of a means for winding up the fishing line on said line spool wherein brake means for acting on the line spool comprise two independent brake members, including a powerful friction brake for use when winding up said line on said line spool, and an adjustable bait drag having a braking power which is negligble compared to the braking power produced by said friction brake, said adjustable bait drag being intended for use when fishing with live bait, said two brake members in a state of retrieve of the fishing line being constantly engaged, while when fishing with live bait said friction brake is disengaged by means of a slide control connected to a clutch lever and disposed on the outer side of the housing, and wherein reengagement of the friction brake is automatically accomplished when the handle is actuated for winding up the line under the action of the engagement between a crown wheel of the transmission and said clutch lever, said reengagement being promoted by a return spring.

2. Device as claimed in claim 1, wherein the reel, when the handle is operated, automatically returns to an initial position, with the friction brake engaged, under the action of one or more projections provided on the crown wheel of the transmission and acting on the clutch lever, said return movement being assisted by the return spring.

3. Device as claimed in claim 1, wherein the friction brake is engageable and disengageable by said slide control disposed on an upper surface of the reel housing.

4. Device as claimed in claim 1, wherein the friction brake is engageable and disengageable by said slide control disposed on a lower surface of the reel housing.

* * * * *